UNITED STATES PATENT OFFICE.

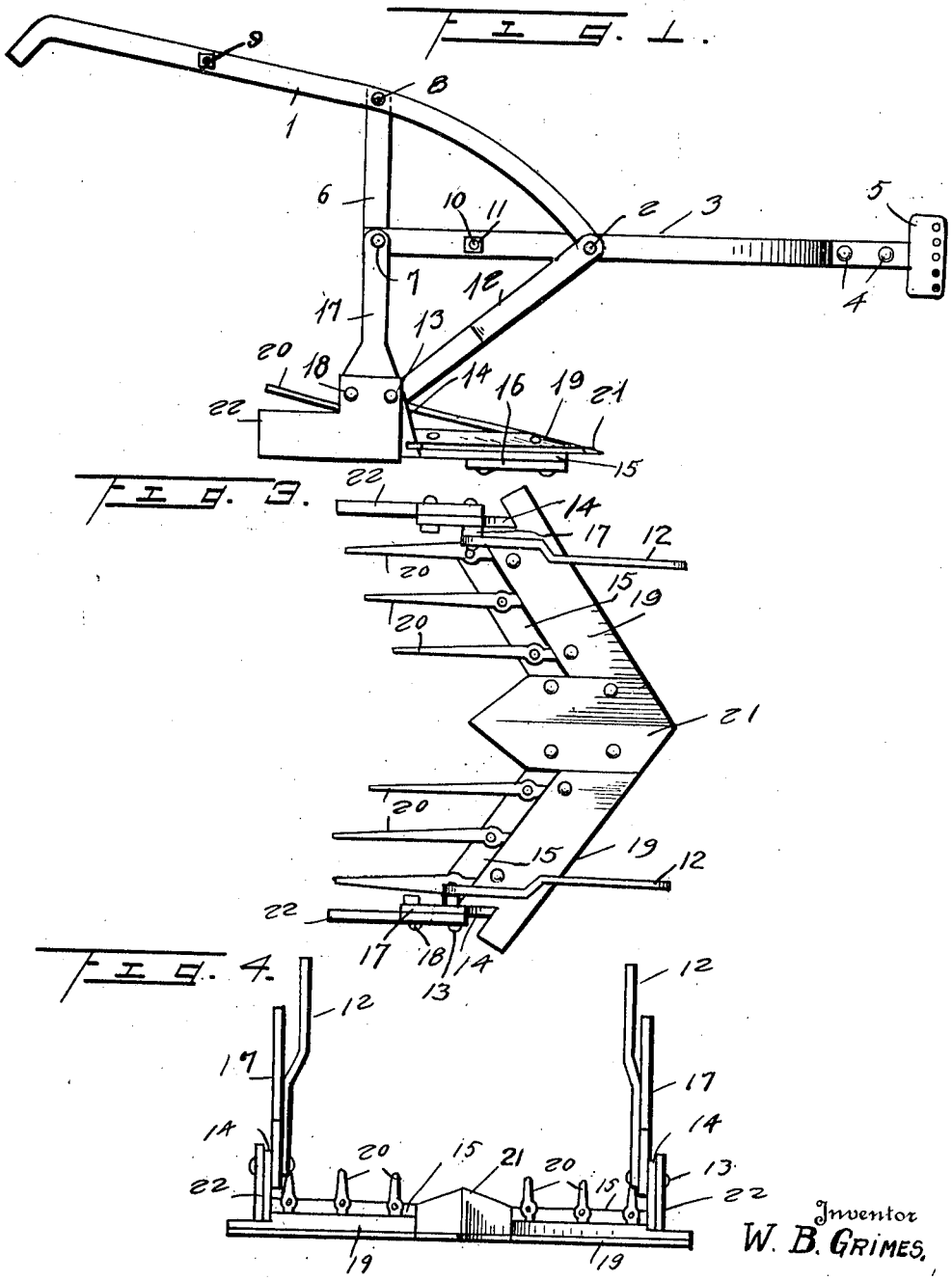

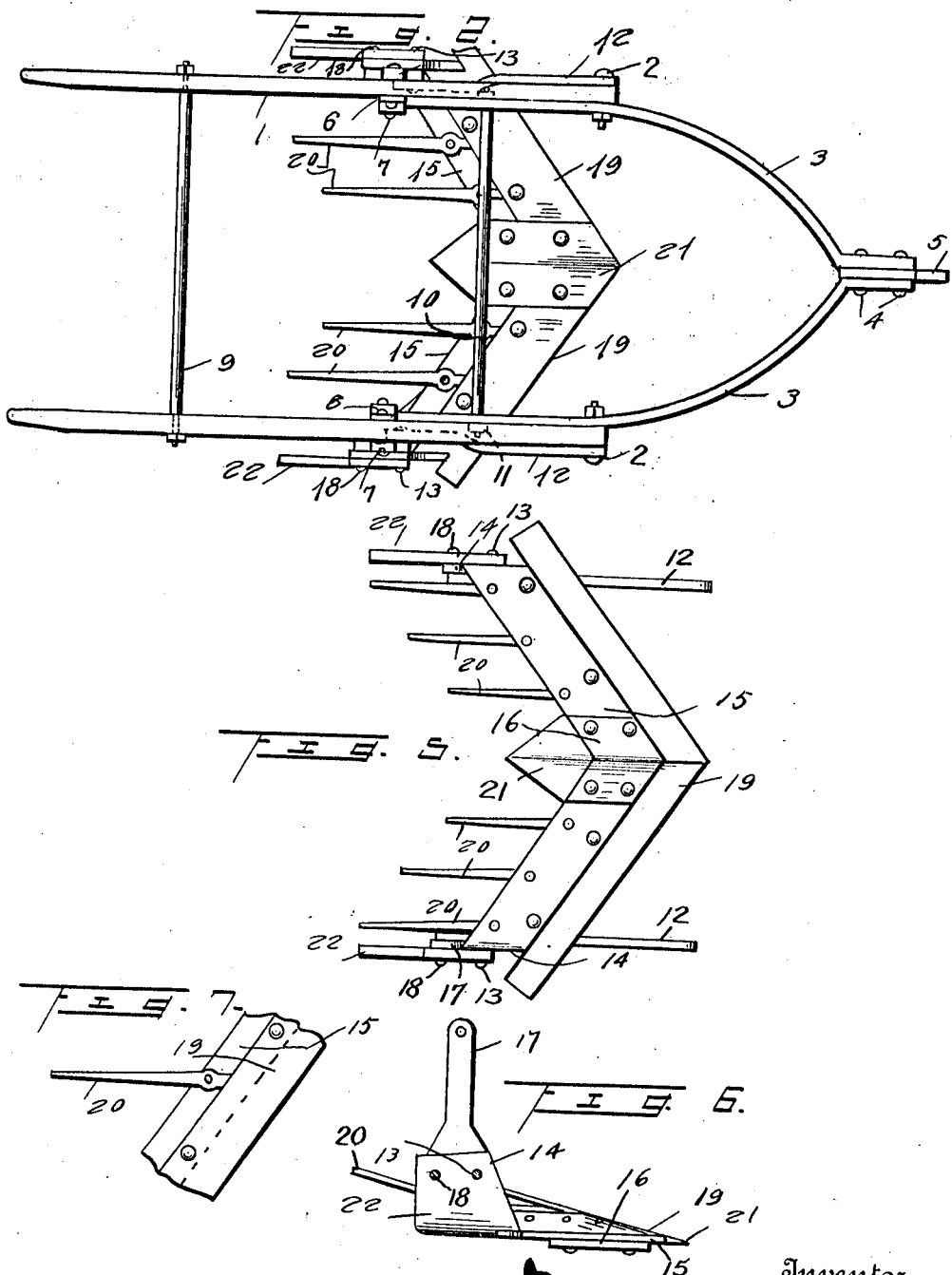

WILLIAM B. GRIMES, OF OPP, ALABAMA.

PLOW.

1,314,394.　　　　Specification of Letters Patent.　　Patented Aug. 26, 1919.

Application filed November 1, 1918. Serial No. 260,711.

*To all whom it may concern:*

Be it known that I, WILLIAM B. GRIMES, a citizen of the United States, residing at Opp, in the county of Covington and State of Alabama, have invented certain new and useful Improvements in Plows; and I do hereby declare the following to be a full, clear, and exact description of the invention, such as will enable others skilled in the art to which it appertains to make and use the same.

This invention relates to plows, and more particularly to a plow specially adapted for harvesting peanuts and tuberous plants of various sorts.

One of the main objects of the invention is to provide a plow of comparatively light but strong and durable construction which is so constructed as to readily lift the peanuts from the ground and separate them from the soil as the plow is drawn along a row of peanut plants.

A further object is to provide a plow having a ground entering or shovel member which is adapted to pass beneath the plants, this member carrying upwardly and rearwardly inclined spaced rods which act to elevate the plants and the peanuts attached thereto and to separate them from the soil.

A still further object is to provide a plow in which the handles and associated parts provided when the plow is used as a walking plow may be readily removed, the arms of the plow beam and the parts associated therewith being readily mounted in the frame of a wheel plow or of a stalk cutter, the ground entering member being so shaped as to be well adapted for cutting stalks when supported above and closely adjacent the ground surface.

Further objects will appear from the detailed description.

In the drawings:

Figure 1 is a side view of a plow constructed in accordance with my invention.

Fig. 2 is a top plan view.

Fig. 3 is a top plan view of the plowpoint and associated parts.

Fig. 4 is a front view of the same.

Fig. 5 is an underneath plan view of the point and associated parts.

Fig. 6 is a side view of the same.

Fig. 7 is a detail plan view of one of the lifting rods.

The plow is provided with two upwardly and rearwardly inclined handles 1 of the usual construction which are secured by means of bolts 2, at their forward lower ends, to the forwardly converging arms 3 of the plow beam, intermediate the ends thereof. These arms are secured together at their forward ends, as at 4, a suitable clevis or traction attaching member 5 being firmly secured between the forward ends of the arms to facilitate securing of traction means thereto. A brace member 6 is secured at its lower end, by a bolt 7 to the rearward end of each arm 3, the upper end of this brace member being secured by a bolt 8 to handle 1 intermediate the ends thereof. These braces act to maintain the handles in proper relation to the arms of the beam while permitting ready removal thereof when required for a purpose to be later disclosed.

The handles 1 are held in proper spaced relation by a transverse spacing and brace bar 9 secured therein, a similar bar 10 having its ends reduced and inserted through the arms 3 of the plow beam so as to hold these arms in proper spaced relation. The reduced ends of bar 10 project beyond the arms 3 and are threaded to receive securing nuts 11 screwed thereon. The bolts 2 also serve to secure the apertured upper ends of downwardly and rearwardly inclined braces 12, the rear ends of which are secured by bolts 13 to upturned ears 14 provided at the outer ends of forwardly converging frog plates 15 the inner ends of which are secured together by a center plate 16. Substantially vertical braces 17 are permanently secured at their lower ends to the ears 14, outside of the inclined braces 12, by means of the bolts 13 and bolts 18. The upper ends of these vertical braces are secured to the plow beam arms 3 by means of the bolts 7 which are inserted therethrough, and these braces coact with the inclined braces to rigidly support the frog plates 15 and the center plate 16 in position.

As will be noted, the frog plates and the center plate are slightly inclined downwardly and forwardly so as to produce sufficient suck to insure that the plow will enter the ground promptly and will remain embedded therein during the plowing operation. A wing member 19 is secured on the upper face of each of the frog plates. As will be noted, these wing members are disposed in parallelism with the frog plates and project forwardly thereof, the rearward edges of the wing members being spaced in advance of the rearward edges of the frog plates to accommodate a plurality of rearwardly and upwardly inclined rods 20 secured to the plates, these rods extending rearwardly of the plow and being disposed in parallel spaced relation. A plow point 21 is secured to the frog plates at the central portion thereof, the forward portion of this point being of substantial V-shape and its sides disposed at a slight angle to the forward edges of the wings as shown. This point projects rearwardly between the rods 20, being inclined upwardly and rearwardly, and rearwardly tapered so as to provide a central lifting and splitting member. As will be noted, the plowpoint is inclined in opposite directions from its transverse center thus producing a point of the middle burster type. A shoe or runner 22 is secured to each of the ears 14 of the frog plates and projects slightly below the same, the lower edge of this shoe being substantially horizontal. These shoes or runners provide means whereby the point structure is supported so as to be readily drawn through the ground, the suck of the plow serving to hold these runners depressed and the runners serving to insure plowing at a uniform depth.

In the event that it be desired to use the plowing structure in connection with a wheel plow, or with the frame of a stalk cutter, the handles 1 and braces 6 therefrom are detached from the arms of the plow beam thus producing a structure which may be readily and easily secured to the frame of a wheel plow or of a stalk cutter so as to be suspended therefrom in the well known manner. This renders it possible to quickly and easily convert a plow from a walking plow into a wheel plow, or vice versa.

It will be evident that there may be slight changes made in the construction and arrangement of the details of my invention without departing from the field and scope of the same, and I intend to include all such variations, as fall within the scope of the appended claims, in this application in which a preferred form only of my invention is disclosed.

What I claim is:

1. In plows, a plow beam, forwardly converging frog plates suspended therefrom and rigidly connected at their forward ends, a plowpoint secured to said plates at the apex thereof and projecting forwardly and rearwardly of the plates, the point being inclined in opposite directions throughout its whole length from its transverse center, wings secured on the frog plates in substantial parallelism therewith extending from the sides of said point, and upwardly and rearwardly inclined spaced separating members projecting from said frog plates in rear of the wings and acting to separate the peanuts plowed from the soil.

2. In a plow, a plow beam, forwardly converging frog plates suspended therefrom and rigidly connected at their forward ends, said plates being inclined downwardly and forwardly, a downwardly and forwardly inclined plowpoint secured to said plates at the apex thereof and projecting forwardly and rearwardly of the plates, wings carried by the frog plates in substantial parallelism therewith, said wings being inclined downwardly and forwardly and extending from each side of the plowpoint, horizontally disposed runners carried by the frog plates at the outer ends thereof, said runners projecting slightly below the plates so as to provide supporting means therefor and facilitate passage of the same through the soil while insuring uniform depth of plowing, and separating means mounted in rear of said wings and inclined upwardly and rearwardly therefrom so as to lift the peanuts and vines from the ground and separate the same from the soil as the plow is drawn along a row of peanuts to be plowed.

3. In a plow, a supporting beam, forwardly converging frog plates suspended therefrom and rigidly connected together at their forward ends, a plowpoint secured to said plates at the apex thereof and inclined oppositely from its transverse center, said point projecting forwardly and rearwardly of the plates and being inclined upwardly and rearwardly, upwardly and rearwardly inclined wings secured to the frog plates in substantial parallelism therewith and extending from the sides of the plowpoint, the upper edges of said wings being spaced in advance of the upper edges of the frog plates, and a plurality of upwardly and rearwardly inclined lifting and separating rods bolted at their lower ends to the frog plates adjacent the upper edges thereof and having their lower ends fitting snugly against the upper edges of said wings so as to be held against movement thereby.

In testimony whereof I affix my signature in presence of two witnesses.

WILLIAM B. GRIMES.

Witnesses:
W. F. WARD.
J. A. GRIMES.

Copies of this patent may be obtained for five cents each, by addressing the "Commissioner of Patents, Washington, D. C."